(12) United States Patent
Adachi (10) Patent No.: US 7,287,849 B2
(45) Date of Patent: Oct. 30, 2007

(54) IMAGE FORMING APPARATUS, RECORDING LIQUID, CONVEYOR BELT, RECORDING LIQUID CARTRIDGE

(75) Inventor: Hiroshi Adachi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 391 days.

(21) Appl. No.: 10/529,905

(22) PCT Filed: Aug. 5, 2004

(86) PCT No.: PCT/JP2004/011574

§ 371 (c)(1), (2), (4) Date: Apr. 1, 2005

(87) PCT Pub. No.: WO2005/026029

PCT Pub. Date: Mar. 24, 2005

(65) Prior Publication Data

US 2006/0050124 A1 Mar. 9, 2006

(30) Foreign Application Priority Data

Aug. 6, 2003 (JP) ............................. 2003-287281

(51) Int. Cl.
*B41J 2/01* (2006.01)
*B41J 2/17* (2006.01)
(52) U.S. Cl. .................. 347/104; 347/95; 347/100
(58) Field of Classification Search .............. 347/104
See application file for complete search history.

(56) References Cited

U.S. PATENT DOCUMENTS 5,531,818 A * 7/1996 Lin et al. .................. 106/31.28
6,499,841 B1 12/2002 Uchida et al.
7,159,963 B2 * 1/2007 Nishino ....................... 347/33

FOREIGN PATENT DOCUMENTS

| | | |
|---|---|---|
| EP | 0 930 163 A2 | 7/1999 |
| JP | 07-053081 | 2/1995 |
| JP | 11-115208 | 4/1999 |
| JP | 11-192694 | 7/1999 |
| JP | 2000-263801 | 9/2000 |
| JP | 2001-117393 | 4/2001 |
| JP | 2002-211060 | 7/2002 |
| JP | 2002-249685 | 9/2002 |
| JP | 2002-249691 | 9/2002 |
| JP | 2002-268428 | 9/2002 |
| JP | 2002-370416 | 12/2002 |
| JP | 2003-005456 | 1/2003 |
| JP | 2003-020423 | 1/2003 |
| JP | 2003-55590 | 2/2003 |

* cited by examiner

*Primary Examiner*—Matthew Luu
*Assistant Examiner*—Brian J. Goldberg
(74) *Attorney, Agent, or Firm*—Oblon, Spivak, McClelland, Maier & Neustadt, P.C.

(57) ABSTRACT

An image forming apparatus for forming an image on a recording medium by ejecting a recording liquid to the recording medium at a recording part is disclosed. The image forming apparatus includes a conveyor belt for conveying the recording medium to the recording part, the conveyor belt satisfying a relation of $\gamma > \gamma c$, wherein $\gamma$ (mN/m) is a static surface tension of the recording liquid at 25° C., and $\gamma c$ (mN/m) is a critical surface tension of the conveyor belt, wherein the recording liquid contains a color material in a disperse state.

17 Claims, 5 Drawing Sheets

IMAGE FORMING APPARATUS, RECORDING LIQUID, CONVEYOR BELT, RECORDING LIQUID CARTRIDGE

TECHNICAL FIELD

The present invention relates to an image forming apparatus, a recording liquid, a conveyor belt, and a recording liquid cartridge.

BACKGROUND ART

Conventionally, various types of inkjet recording apparatuses are used as image forming apparatuses including, for example, printers, facsimiles, and copiers. One of the types is a shuttle type inkjet recording apparatus which alternately repeats conveyance and recording for forming (recording) images on a recording medium; more specifically, with the shuttle type inkjet recording apparatus, a recording head for ejecting ink droplets (recording droplets) to a recording medium is serially traversed (scanning) in a direction perpendiculary intersecting a conveyance direction of the recording medium (also referred to as sheet, paper, or target recording medium), while the recording medium is intermittently conveyed according to recording area (width). Another type is a line type inkjet recording apparatus for increasing printing (recording) speed, in which the apparatus uses a line type recording head having a length equivalent to the recording width of the recording medium.

However, with the inkjet apparatuses, maintaining a constant distance between the recording medium and the recording head constant is difficult owing to factors such as warping of the recording medium or a roughness (irregularity) of the surface of the recording medium. In a case where the distance cannot be maintained constant, inconsistency in the distance occurs during a single scan or in one of the lines of a nozzle alignment, to thereby cause inconsistency in ejection time (flying time) of an ejected recording liquid. As a result, the landing area of the ejected recording liquid deviates from a target area. This deviation creates, for example, undesirable white lines and skewed thin lines, and adversely affects image quality.

In order to correct such warping or irregularity of the recording medium, various techniques are proposed for allowing a recording apparatus to convey a recording medium by absorbing the recording medium on a conveyor belt. In one example, a recording medium has its flatness maintained during conveyance by being absorbed to a conveyor belt with employment of electrostatic force. This reduces warping or irregularity of the recording medium during ejection of a recording liquid, thereby maintaining a constant distance between a nozzle and the recording medium.

However, with this technique using the conveyor belt, the conveyor belt may be stained by recording liquid when, for example, an unsteady movement occurs during a printing process. Further, in continuing such printing process where recording liquid is adhered to the conveyor belt, the recording liquid remaining on the conveyor belt may stain the recording medium, and/or may adversely affect the electrostatic absorption to cause conveyance error.

In order to solve the problems, a technique of employing a cleaning roller for removing recording liquid remaining on the conveyor belt, is proposed, for example, in Japanese Laid-Open Patent Application Nos. 7-53081 and 2000-263801.

Furthermore, a technique of employing a cleaning liquid along with the cleaning roller is proposed, for example, in Japanese Laid-Open Patent Application Nos. 11-192694, 2002-211060, and 2002-370416.

In another example shown in Japanese Laid-Open Patent Application No. 2002-249685 (although having an object different from preventing the recording liquid from staining the conveyor belt), a still picture display, which forms images by ejecting ink (recording liquid) onto a belt-like recording medium with use of an inkjet technique under a condition where the critical surface tension of the belt-like recording medium $\gamma c$ and the surface tension of the ink $\gamma L$ satisfy a relation of $\gamma c \leq \gamma L \leq \gamma c+5$ dyne*cm−1, is proposed. With this example, ink can be prevented from blotting or repelled against the recording medium, and a satisfactory dot diameter can be obtained. This example, which is aimed not only to obtain satisfactory dot reproduction performance, but also to remove dried ink on the recording medium, solves the issue of removing dried ink by adding inorganic oxide materials or silicon emulsion.

As another example having a similar object, Japanese Laid-Open Patent Application No. 2002-249691 discloses a full color electronic blackboard, which forms images by ejecting ink (recording liquid) onto a belt-like recording medium with use of an inkjet technique under a condition where the critical surface tension of the belt-like recording medium $\gamma c$ and the surface tension of the ink $\gamma L$ satisfy a relation of $\gamma c \leq \gamma L \leq \gamma c+5$ dyne*cm−1, and thus where the critical surface tension of the belt-like recording medium $\gamma c$ at 25° C. is set to 25-50 dyne*cm−1. Also with this example, ink can be prevented from blotting or repelled against the recording medium, and a satisfactory dot diameter can be obtained. This example is aimed not only to obtain satisfactory dot reproduction performance, but also to allow ink to satisfactorily fix to the recording medium, and to remove dried ink on the recording medium. In this example, the issue of fixing performance is solved by adding of a polymer.

With the conventional examples, however, recording liquid remaining on a conveyor belt could not be sufficiently removed since no consideration is made regarding the combination of the recording liquid and the conveyor belt.

Furthermore, the conventional apparatus employing the cleaning roller and the cleaning liquid requires, for example, a supplying apparatus for supplying the cleaning liquid, or a heating or blowing apparatus for drying the wetted conveyor belt. This leads to increase in size and cost of the apparatus.

Furthermore, the conventional still picture display or electronic blackboard cannot be suitably applied for removing recording liquid on a conveyor since ink removability is not considered from aspects of the critical surface tension of the recording medium or the surface tension of the recording liquid.

DISCLOSURE OF THE INVENTION

It is a general object of the present invention to provide an image forming apparatus, a recording liquid, a conveyor belt, and a recording liquid cartridge that substantially obviate one or more of the problems caused by the limitations and/or disadvantages of the related art.

Features and advantages of the present invention will be set forth in the description which follows, and in part will become apparent from the description and the accompanying drawings, or may be learned by practice of the invention according to the teachings provided in the description.

Objects as well as other features and advantages of the present invention will be realized and attained by an image forming apparatus, a recording liquid, a conveyor belt, and a recording liquid cartridge particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image forming apparatus for forming an image on a recording medium by ejecting a recording liquid to the recording medium at a recording part, the image forming apparatus including: a conveyor belt for conveying the recording medium to the recording part, the conveyor belt satisfying a relation of $\gamma > \gamma c$, wherein $\gamma$ (mN/m) is a static surface tension of the recording liquid at 25° C., and $\gamma c$ (mN/m) is a critical surface tension of the conveyor belt, wherein the recording liquid contains a color material in a dispersed state.

In the image forming apparatus according to an embodiment of the present invention, the conveyor belt may absorb the recording medium thereto when conveying the recording medium.

In the image forming apparatus according to an embodiment of the present invention, the conveyor belt may absorb the recording medium by using electrostatic force.

In the image forming apparatus according to an embodiment of the present invention, the image forming apparatus may further include a cleaning part for removing the recording liquid situated on the conveyor belt.

In the image forming apparatus according to an embodiment of the present invention, the cleaning part may be a porous member.

Furthermore, the present invention provides a recording liquid for being ejected to a recording medium conveyed by a conveyor belt, the recording liquid including: a color material in a dispersed state, wherein the recording medium satisfies a relation of $\gamma > \gamma c$, wherein $\gamma$ (mN/m) is a static surface tension of the recording liquid at 25° C., and $\gamma c$ (mN/m) is a critical surface tension of the conveyor belt.

In the recording liquid according to an embodiment of the present invention, the static surface tension of the recording liquid $\gamma$ may satisfy a relation of $\gamma \geqq 20$.

In the recording liquid according to an embodiment of the present invention, the color material may be a pigment.

In the recording liquid according to an embodiment of the present invention, the recording liquid may further include a humectant.

In the recording liquid according to an embodiment of the present invention, the recording liquid at 25° C. may have a viscosity ranging from 1 mPa·sec to 30 mPa·sec.

Furthermore, the present invention provides a conveyor belt for conveying a recording medium to a recording part at which a recording liquid is ejected onto the recording medium; the conveyor belt including: a belt part satisfying a relation of $\gamma > \gamma c$, wherein $\gamma$ (mN/m) is a static surface tension of the recording liquid at 25° C., and $\gamma c$ (mN/m) is a critical surface tension of the belt part of the conveyor belt, wherein the recording liquid contains a color material in a dispersed state.

In the conveyor belt according to an embodiment of the present invention, the belt part may be formed of two or more layers.

In the conveyor belt according to an embodiment of the present invention, at least one of the two or more layers may be a charge adjustment layer.

In the conveyor belt according to an embodiment of the present invention, at least one of the two or more layers may be a surface tension adjustment layer.

In the conveyor belt according to an embodiment of the present invention, at least one of the two or more layers may be a mechanical strength adjustment layer.

In the conveyor belt according to an embodiment of the present invention, at least one of the two or more layers may be a chemical protection layer.

Furthermore, the present invention provides a recording liquid cartridge including an ink containing unit for containing the recording liquid according to an embodiment of the present invention.

Other objects and further features of the present invention will be apparent from the following detailed description when read in conjunction with the accompanying drawings.

BEST MODE FOR CARRYING OUT THE INVENTION

In the following, embodiments of the present invention will be described in detail with reference to the accompanying drawings.

Figure 1:
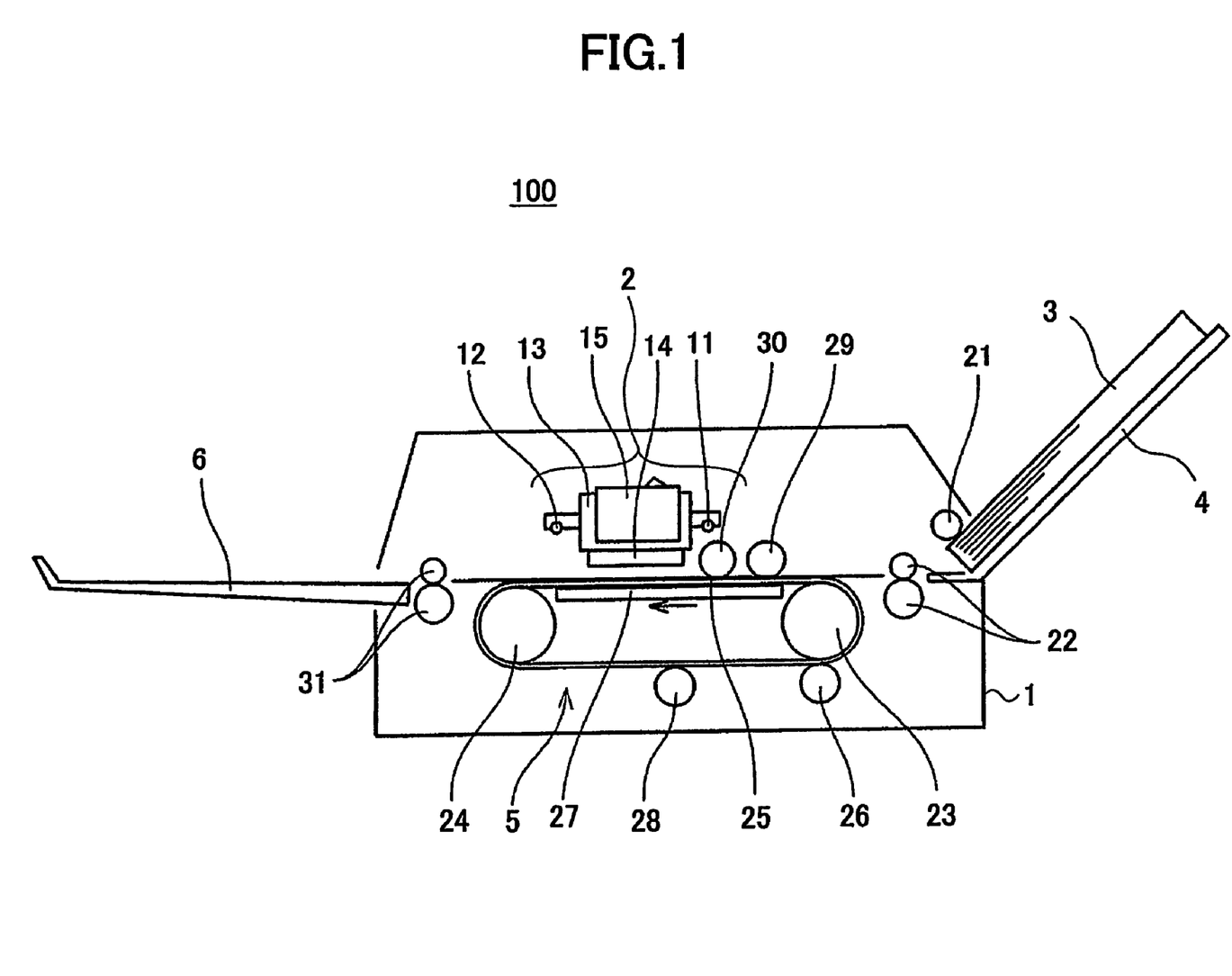
FIG. 1 is a schematic diagram showing a mechanism part of an inkjet recording apparatus (image forming apparatus) according to an embodiment of the present invention.
Figure 2:
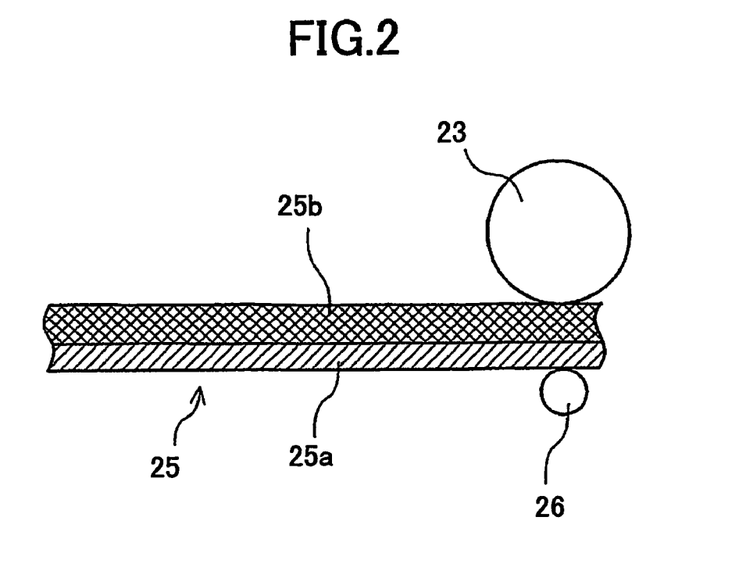
FIG. 2 is a cross-sectional diagram of a conveyor belt of an inkjet recording apparatus (image forming apparatus) according to an embodiment of the present invention.

An inkjet recording apparatus (image forming apparatus) 100 according to a first embodiment of the present invention is described with reference to FIGS. 1 and 2. FIG. 1 is a schematic diagram showing an overall structure of the inkjet recording apparatus 100, and FIG. 2 is a schematic cross-sectional diagram of a conveyor belt of the inkjet recording apparatus 100.

The inkjet recording apparatus 100 includes, for example, an image forming part (recording part) 2 disposed inside a recording apparatus main body 1, and a paper-feed tray 4 disposed on one of the sides of the recording apparatus main body 1 for stacking large amounts of recording media (hereinafter referred to as paper or plain paper) 3. Accordingly, the paper 3 fed from the paper-feed tray 4 has a required image recorded thereto by the image forming part 2 while being conveyed by a conveyance mechanism 5. After the image is recorded to the paper 3, the paper 3 is delivered out from a deliver tray 6 disposed on the other side of the recording apparatus main body 1.

In the image forming part 2, a carriage 13, being slidably held by guide shafts 11, 12, is moved in a direction (main scanning direction) perpendicularly intersecting with the paper conveying direction by a main scanning motor (not shown). The carriage 13 includes a recording head 14 having a recording liquid ejection head with an alignment of nozzle ports from recording liquid is ejected. The carriage 13 also has a recording liquid cartridge 15 detachably attached thereto for supplying recording liquid to the recording head 14.

The recording head 14 may employ, for example, a set of four inkjet heads where each inkjet head serves to eject ink droplets of yellow (Y), cyan (C), magenta (M), and black (Bk). Alternatively, the recording head 14, may be a single inkjet head having a plural rows of nozzles (nozzle alignment) for ejecting each of the colors. It is to be noted, however, that the number (variety) of the colors or the order of the colors is not to be limited.

The inkjet head included in the recording head 14 may have an energy generating part for ejecting ink provided thereto, for example, a piezoelectric actuator (e.g. piezoelectric element), a thermal actuator utilizing phase change of boiling liquid film with electrothermal converting element (e.g. thermal resistance member), a shape-memory alloy actuator utilizing phase change of metal according to temperature change, or a electrostatic actuator for using electrostatic force.

The paper 3 on the paper-feed tray 4 is fed sheet by sheet to the recording apparatus main body 1 using a roller 21, and is sent to the conveyance mechanism 5 by paper-feed roller 22.

The conveyance mechanism 5 includes, for example, a conveyor belt (belt part) 25 hooked across a driving roller 23 and a driven roller 24, a charge roller 26 for charging the conveyor belt 25, a guide member (platen plate) 27 disposed at a portion opposite of the image forming part 2 for guiding the conveyor belt 25, a cleaning roller (recording liquid removing member) 28 having a porous member (cleaning part) for removing liquid adhered to the conveyor belt 25, a charge removing roller 29 mainly formed of conductive rubber for removing electricity on the paper 3, and a paper-pressing roller 30 for applying pressure to the paper 3 in a direction toward the conveyor belt 25.

The conveyor belt 25 is an endless belt that is hooked across by the driving roller 23 and the driven roller (tension roller) 24. The conveyor belt 25 is rotated in the arrow direction shown in FIG. 1 (paper conveyance direction). The conveyor belt 25 may be a belt part having, for example, a single layer, a double layer with first and second layers (front layer and back layer) as shown in FIG. 2, or three or more layers. The charge roller 26, contacting a front layer of the conveyor belt 25, is disposed at a position for rotating in correspondence with the rotation of the conveyor belt 25.

Delivery rollers 31 are disposed downstream of the conveyance mechanism 5 for sending out the paper having an image recorded thereto to the delivery tray 6.

The conveyor belt 25 is rotated in the arrow direction shown in FIG. 1, and is charged as positive by being applied with high voltage (for example, +1500 V) from the contacting charge roller 26. When the paper 3 is fed onto the charged conveyor belt 25, the inside of the paper 3 becomes a polarized state, in which a weak absorbing force is generated, and a surface of the paper 3 opposite to the conveyor belt 25 is charged as positive.

As the paper 3 is further conveyed, the paper 3 contacts the charge removing roller 29. Since the charge removing roller 29 is applied with a negative high voltage (e.g. −500 V) being antipole to the charge roller 26, the surface of the paper 3 becomes minus charged, thereby reducing the potential at the surface of the paper 3. Accordingly, the absorbing strength of the minus charged paper 3 is increased.

Accordingly, since the paper 3 is firmly absorbed to the conveyor belt 25, warping and irregularity of the paper 3 can be corrected (restrained). Therefore, the paper 3 is in a sufficiently flat state when reaching the platen plate 27. By obtaining the flat state, even when the recording head 14 is formed with a long length, a constant distance between the nozzle of the recording head 14 and the paper 3 can be maintained, and recording liquid can be prevented from deviating from a target dropping area. Accordingly, the paper 3 can be positively conveyed by the conveyor belt 25 in a state firmly absorbed thereto. In addition, the electrostatic absorbing force allows the paper 3 to be positively conveyed without having foreign particles adhered thereto.

In the recording operation, while the conveyor belt 25 rotates and conveys the paper 3, the recording head 14 is driven according to image signals. For example, the recording head 14 ejects ink (ink droplets) for a prescribed line, and then, to a next line after the paper is conveyed (advanced) for a predetermined amount. After receiving a signal indicating that recording is completed or that the rear tip of the paper 3 has reached a recording area, the recording operation. Accordingly, the paper 3 having an image recorded thereto is delivered out to the delivery tray 6 by the delivery rollers 31.

The ink (recording liquid) remaining on the conveyor belt 25 is removed by the cleaning roller (recording liquid removing member) 28. The cleaning roller 28 serves to automatically remove the ink remaining on the conveyor belt 25. By employing the porous member as the cleaning part of the cleaning roller 28, a more reliable ink removing performance can be attained.

In the recording apparatus 100, the ink (recording liquid), which is provided in the recording liquid cartridge 15 for being ejected from the recording head 14, contains a color material in a dispersed state, and satisfies a relation of $\gamma > \gamma c$ at 25° C., wherein $\gamma$ is the static surface tension (mN/m) of the ink and $\gamma c$ is the critical surface tension of the conveyor belt 25.

It is difficult to attain a satisfactory performance merely by contacting the cleaning roller 28 (e.g. recording liquid removing member using an absorbing material) against the conveyor roller. A more sufficient performance can be attained by controlling the relation between the surface tension of the ink $\gamma$ and the critical surface tension $\gamma c$.

First, the recording liquid is required to separate from the conveyor belt 25 for enabling the cleaning roller 28 to absorb a large amount of recording liquid. For example, in a case of $\gamma < \gamma c$, the conveyor belt 25 is completely wetted by the recording liquid in which the contact angle of the recording liquid on the conveyor belt 25 is 0 degrees. In this state, recording liquid on the conveyor belt 25 is absorbed by the cleaning roller 28 only at portions of the conveyor belt 25 where large amount of recording liquid remain. A large portion of the recording liquid is pulled toward the conveyor belt 25, and is not absorbed by the cleaning roller 28.

More particularly, when a recording liquid containing a color material (e.g. pigment) in a dispersed state is scarcely left on the conveyor belt 28, the color material separates after the vaporization of a solvent in the recording liquid. Particles, cohering to each other in the separated color material, are formed into large particles, to thereby firmly adhere onto the conveyor belt 25. Once these particles adhere onto the conveyor belt 25, it is difficult for the cleaning roller 28 to remove the particles even by rubbing against the conveyor belt 25. In a case of using a recording liquid containing a color material (e.g. dye) in a dissolved state, even when the recording liquid is scarcely left on the conveyor belt 25, the color material would not separate nor cohere. Therefore, the recording liquid can be removed with the cleaning roller 28 in a relatively easy manner.

In a case of $\gamma > \gamma c$, the contact angle of the recording liquid on the conveyor belt 25 is a prescribed degree that is not 0 degrees. When recording liquid contacts the cleaning roller 28, the recording liquid is absorbed by a capillary phenomenon of the cleaning roller while maintaining a prescribed contact angle since the cohesive force is greater than the surface tension of the conveyor belt 25. The contact area between the recording liquid and the conveyor belt becomes smaller as the cleaning roller 28 absorbs the recording liquid. Eventually the recording liquid on the conveyor belt 28 is completely removed by the cleaning roller 28. Accordingly, since recording liquid can be completely removed as in this case, no separation nor cohesion of color material, and no adhering of recording liquid on the conveyor belt 25 occurs even when a recording liquid having color material dispersed therein (such as dye) is employed.

The rate of the absorbency differs depending on the difference between the critical surface tension of the conveyor belt and the surface tension of the recording liquid, the viscosity of the recording liquid, and/or capillary attraction of the cleaning part. Nevertheless, even if the absorbency rate differ, the recording liquid can be completely absorbed by the cleaning part, thereby completely removing the recording liquid on the conveyor belt.

For example, when printing (recording) is completed, or when turning off the power, the charge removing roller 29 removes the charge on the conveyor belt 25 by contacting the charge removing roller 29 with the conveyor belt in a state where no paper 3 is disposed on the conveyor belt 25, and thus rotating the conveyor belt 25. This prevents dust or foreign particles from adhering to the conveyor belt 25 when the image forming apparatus is not in use. That is, although a large amount of dust or foreign particles adhering to the conveyor belt 25 reduces the absorbing strength of the conveyor belt 25 and causes the paper 3 to jam during conveyance, such problems can be prevented.

Figure 3:
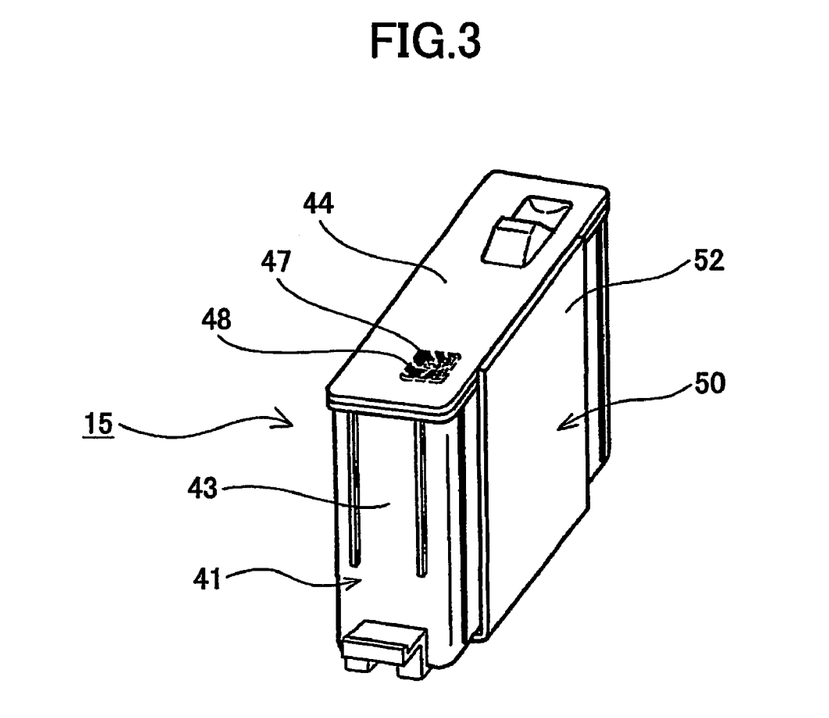
FIG. 3 is an outer perspective view showing a recording liquid cartridge used for an inkjet recording apparatus (image forming apparatus) according to an embodiment of the present invention.
Figure 4:
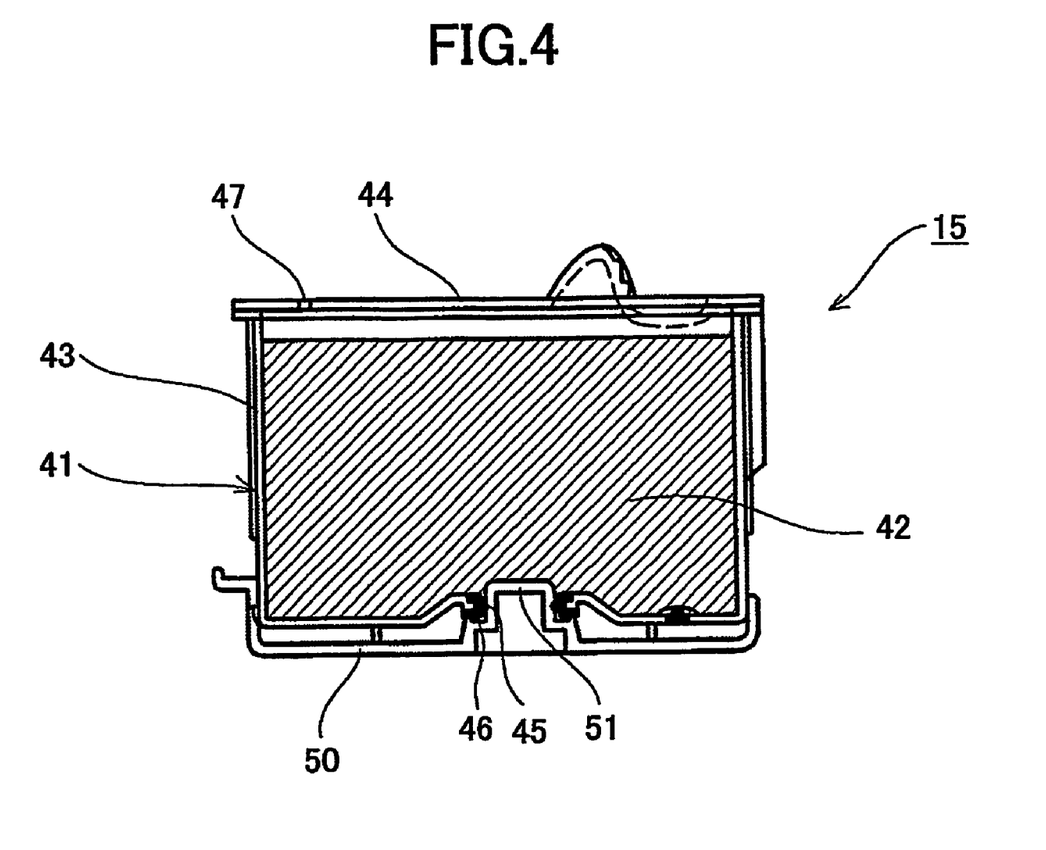
FIG. 4 is a front cross sectional view showing a recording cartridge according to an embodiment of the present invention.

Next, the recording liquid cartridge 15 according to an embodiment of the present invention is described with reference to FIGS. 3 and 4. FIG. 3 is an outer perspective view showing the recording liquid cartridge 15, and FIG. 4 is a front cross sectional view of the recording liquid cartridge 15.

The recording liquid cartridge 15 has installed therein an ink absorbing member 42 disposed inside a cartridge main body 41 for absorbing ink of a prescribed color according to the present invention. The cartridge main body 41 is formed by adhering or welding a case 43 having a wide opening at its top part to an upper lid member 44 at said opening. The cartridge main body is, for example, a resin mold member. The ink absorbing member 42 is a porous member (e.g. urethane foam member). The ink is absorbed by the absorbing member 42 after the absorbing member 42 is compressed and inserted into the cartridge main body 41.

An ink supply port 45 (containing unit) is formed at a bottom part of the case 43 of the cartridge main body 41. The inner peripheral surface of the ink supply port 45 is engaged to a sealing ring 46. The upper lid member 44 has an air opening 47, in which plural grooves 48 are formed, in an encircling manner, at the periphery of the air opening. The plural grooves 28 are formed in communication with each other and also in communication with the air opening 47.

A cap member 50 is attached, in a manner sealing the ink supply port 45, to the cartridge main body 41 before installment of the recording liquid cartridge 15, so that ink can be prevented from leaking caused by, for example, handling of the recording liquid cartridge 15 (e.g. installment or transportation) or by pressure applied to the case 43 from the width direction during vacuum packaging of the recording liquid cartridge 15.

The ink (recording liquid) inside the recording liquid cartridge 15 contains a color material in a dispersed state, and satisfies a relation of $\gamma > \gamma c$ at 25° C., wherein $\gamma$ is the static surface tension (mN/m) of the ink and $\gamma c$ is the critical surface tension of the conveyor belt 25.

Next, the ink (recording liquid) used for image forming apparatus according to an embodiment of the present invention is described.

First, it is preferable that the recording liquid satisfies a relation of $\gamma \geq 20$ at 25° C., wherein $\gamma$ is the static surface tension of the recording liquid. This ensures a steady recording liquid ejection performance.

That is, droplets of the recording liquid can be satisfactorily formed by satisfying the relation of $\gamma \geq 20$ at 25° C., wherein $\gamma$ is the static surface tension of the recording liquid. Accordingly, a clear image can be formed. In a case of $20 > \gamma$, recording liquid completely leaks from the nozzle plate or spills out from the vicinity of the nozzle due to low contact angle. This causes unsatisfactory formation of recording liquid droplets since meniscus cannot be properly formed, thereby resulting to skewing of the recording liquid ejection direction, creation of undesired satellite droplets, and creation of mist. In some cases, the recording liquid may not be ejected at all. Since a desired pixel cannot be formed under such condition, unsatisfactory images may be formed.

As described above the recording liquid according to an embodiment of the present invention contains a color material. The color material in the recording liquid may be contained in a dissolved state or in a dispersed state. In a case of a color material in a dissolved state, it is preferable to employ dye as the color material. In a case of a color material in a dispersed state, it is preferable to employ a pigment or a dye having little solubility with respect to a solvent as the color material. By employing a pigment, high light resistance and water resistance can be attained.

Among the color material, it is preferable to use the color material in a dispersed state. By employing the color material in a dispersed state, a change of pH occurs at the moment a droplet of the ejected recording liquid strikes the recording medium 3, thereby separating (destroying) the dispersed color material and allowing the color material to cohere, or causing a phenomenon where the color material is caught in the fibers of the recording medium 3 without trickling out from the recording medium 3. Accordingly, feathering or color bleeding can be prevented, and a clear image can be obtained.

In a case where a color material in a dissolved state is employed, the color material cannot cohere since the dissolved color material hardly separates even when a change of pH occurs at the moment a droplet of the ejected recording liquid strikes the recording medium 3. In addition, in employing the color material in the dissolved state, the recording liquid penetrating the recording medium cannot be sufficiently caught in the fibers of the recording medium, thereby causing the recording liquid to trickle out from the recording medium 3. Accordingly, feathering or color bleeding cannot be prevented, and a clear image cannot be obtained.

As for the dye that is used according to an embodiment of the present invention, it is preferable to used a dye with high light resistance and water resistance among the dyes categorized as acidic dye, direct dye, reactive dye, and food dye according to color index. These dyes may also be mixed with each other or mixed with another color element such as pigment. These can be added as long as the advantage of the present invention can be attained.

As for the acidic dye and the food dye, there is, for example, C.I. acid yellow 17, 23, 42, 44, 79, 142, acid red 1, 8, 13, 14, 18, 26, 27, 35, 37, 42, 52, 82, 87, 89, 92, 97, 106, 111, 114, 115, 134, 186, 249, 254, 289, C.I. acid blue 9, 29, 45, 92, 249, and C.I. acid black 1, 2.

As for the direct dye, there is, for example, C.I. direct yellow 1, 12, 24, 26, 33, 44, 50, 86, 120, 132, 142, 144, C.I. direct red 1, 4, 9, 13, 17, 20, 28, 31, 39, 80, 81, 83, 89, 225, 227, C.I. direct orange 26, 29, 62, 102, C.I. direct blue 1, 2, 6, 15, 22, 25, 71, 76, 79, 86, 87, 90, 98, 163, 165, 199, 202, and C.I. direct black 19, 22, 32, 38, 51, 56, 71, 74, 75, 77, 154, 168, 171.

As for the reactive dye, there is, for example, C.I. reactive black 3, 4, 7, 11, 12, 17, C.I. reactive yellow 1, 5, 11, 13, 14, 20, 21, 22, 25, 40, 47, 51, 55, 65, 67, C.I. reactive red 1, 14, 17, 25, 26, 32, 37, 44, 46, 55, 60, 66, 74, 79, 96, 97, C.I. reactive blue 1, 2, 7, 14, 15, 23, 32, 35, 38, 41, 63, 80, 95.

It is particularly preferable to employ acid dye and direct dye as the dye according to an embodiment of the present invention.

Next, the pigment that can be used according to an embodiment of the present invention is described in detail. The pigments such as an organic pigment or an inorganic pigment described below may be mixed with each other or may be mixed with another color element such as dye. These can be added as long as the advantage of the present invention can be attained.

As for the organic pigment, there is, for example, azo pigment, phthalocyanine pigment, anthraquinone pigment, dioxiadine pigment, indigo pigment, thioindigo pigment, perylene pigment, isoindolinone pigment, aniline black pigment, azomethine pigment, Rhodamine B lake pigment, and carbon black.

Further, it is preferable that the pigment has a particle diameter of 0.01-0.15 μm.

As for the inorganic pigment, there is, for example, iron oxide, titanium oxide, calcium carbonate, barium sulfate, aluminum hydroxide, barium yellow, iron blue, cadmium red, chrome yellow, and metallic powder. Further, it is preferable that the pigment has a particle diameter of 0.01-0.15 μm. With a particle diameter less than 0.01 μm, the opacifiying strength is reduced, and the density becomes low. In addition, light resistance is reduced, and becomes a level equal to a conventional dye when mixed with a high polymer dye. Furthermore, with a particle diameter greater than 0.05 μm, clogging in the recording head or in the filter of the printer occurs, and a steady recording liquid ejection performance cannot be attained.

It is preferable to use the below given water soluble organic solvents for achieving the objects, such as, obtaining a recording liquid with a desired physical property, preventing drying of a recording liquid for obtaining a satisfactory ejection performance, and enhancing, for example, the dissolving performance and/or dispersion performance of the color material.

As for the solvents, there is, for example, ethyleneglycol, diethyleneglycol, triethyleneglycol, polyethyleneglycol, polypropyleneglycol, 1,5-pentanediol, 1,5-hexandiol, glycerol, 1,2,6-hexantriol, 1,2,4-butanetriol, 1,2,3-butanetriol, petriol, other polyhydric alcohols, ethyleneglycolmonoethylether, ethyleneglycolmonobutylether, diethyleneglycolmonomethylether, diethyleneglycolmonoethylether, diethyleneglycolmonobutylether, tetraethyleneglycolmonomethylether, propyleneglycolmonoethylether, other polyhydric alcohol alkyl ethers, ethyleneglycolmonophenylether, ethyleneglycolmonobenzylether, other polyhydric alcoholarylethers, N-methyl-2-pyrrolidone, N-hydroxyether-2-pyrrolidone, 2-pyrrolidone, 1,3-dimethylimidazolidinone, ε-caprolactam, other N-heterocyclic compounds, formamide, N-methylformamide, N, N-dimethylformamide, other amides, monoethanolamine, diethanolamine, triethanolamine, monoethylamine, diethylamine, triethylamine, other amines, dimethylsulfoxide, sulfolane, thiodiethanol, other sulfur containing compounds, propylenecarbonate, ethylenecarbonate, and γ butyrolactone. These solvents or a mixture of these solvents may be used with water.

Among these solvents, it is preferable to use diethyleneglycol, thiodiethanol, polyethyleneglycol 200-600, triethyleneglycol, glycerol, 1,2,6-hexantriol, 1,2,4-butanetriol, petriol, 1,5-pentanediol, N-methyl-2-pyrrolidone, N-hydroxyether-2-pyrrolidone, 2-pyrrolidone, and 1,3-dimethylimidazolidinone. By using these solvents, advantageous performance can be attained regarding solubility and dispersibility of the color material, and prevention of unsatisfactory ejection performance caused by moisture evaporation.

It is preferable for the recording liquid to contain a penetrant according to an embodiment of the present invention.

The penetrant serves to enhance the wetting property of the recording liquid with respect to the recording medium. It is preferable for the pentetrant to satisfy the below given formulas (I)-(IV). That is, the polyoxyethylenealkylphenylether surface active agent of (I), the acetyleneglycol surface active agent of (II), the polyoxyethylenealkylether surface active agent of (III), and the polyoxyethylenepolyoxypropylenealkylether surface active agent of (IV) serve to reduce the surface tension of the liquid, thereby enhancing wetting property and increasing permeation (penetration) property.

(I)

(R is a hydrocarbon chain with a carbon number of 6-14 which may be branched, k: 5-20)

(II)

(m, n ≦ 20, 0 < m+n ≦ 40)

(III)

(R is a hydrocarbon chain with a carbon number of 6-14 which may be branched, k: 5-20)

(IV)

(R is a hydrocarbon chain with a carbon number of 6-14, m and n are numbers that are no more than 20)

As for a compound besides those of (I)-(IV), there is, for example, diethyleneglycolmonophenylether, ethyleneglycolmonophenylether, ethyleneglycolmonoarylether, diethyleneglycolmonobutylether, propyleneglycolmonobutylether, tetraethyleneglycolchlorophenylether, other polyalcohol alkyls and aryls, polyoxyethylenepolyoxypropyleneblock copolymer, other nonion surface active agents, fluorine surface active agent, ethanol, 2-propanol, and other lower alcohols. It is particularly preferable to employ diethyleneglycolmonobutylether.

In order to prevent elution or corrosion of a member making contact with the recording medium, it is preferable to add a pH regulator or an anti-rust agent to the recording liquid according to an embodiment of the present invention. A given substance may be employed as the pH regulator as long as the ink can be regulated to a pH of 6 or more without adversely affecting the ink. As for the pH regulator, there is, for example, diethanolamine, triethanolamine, other amines, lithium hydroxide, sodium hydroxide, potassium hydroxide, other alkaline metal hydroxides, ammonium hydroxide, quaterary ammonium hydroxide, quaternary phosphonium hydroxide, lithium carbonate, sodium carbonate, potassium carbonate, and other alkaline metal carbonates. As for the anti-rust agent, there is, for example, acidsulfite, sodiumthiosulfate, thiodiglycolacidammon, diisopropylammoniumnitrite, tetranitratepentaerythritol, and dicyclohexylammoniumnitrite.

It is preferable, for an anticeptic purpose, to add an anti-microbial agent to the recording liquid according to an embodiment of the present invention. As for the anti-microbial agent, there is, for example, sodium dehydro acetate, sodium sorbic acid, 2-pyridinethiol-1-sodiumoxide, isothiazolin compound, benzoicsodium, and pentachlorophenolsodium.

In order to restrain undesired foaming, it is preferable to add a defoaming agent to the recording liquid according to an embodiment of the present invention. It is preferable to employ, for example, a silicon defoaming agent. Although there is an oil type, a compound type, a self-emulsifying type, or an emulsion type used as the silicon defoaming agent, it is preferable to employ the self-emulsifying type for ensuring reliablilty considering use with water. A denatured silicon defoaming agent may also be employed, such as, amino denaturant, carbinol denaturant, methacryl denaturant, polyether denaturant, alkyl denaturant, higher fatty acid ester denaturant, and alkyleneoxide denaturant.

As for commercially available silicon defoaming agents, there is, for example, silicone defoaming agent KS508, KS531, KM72, KM85 (product name) of Shinetsu Kagaku Kogyo Corporation, silicone defoaming agent Q2-3183A, SH5510 (product name) of Toray Dow Corning Corporation, silicone defoaming agent SAG30 (product name) of Nihon Unica Corporation, and silicone defoaming agent Adekanol series (product name) of Asahi Denka Kogyo Corporation.

It is preferable for the viscosity of the recording liquid at 25° C. to range from 1-30 m Pa·sec according to an embodiment of the present invention. By setting the viscosity in the range of 1-30 m Pa/sec, a creation of mist caused by the recording liquid bouncing off from the recording medium can be prevented, and a steady ejection performance can be attained, to thereby obtain a clear image.

That is, when the viscosity is less than 1 m Pa/sec, the viscosity of the recording liquid is so low that a mist is created by recording liquid bouncing off from the recording liquid upon contacting the recording medium, and scattering of the mist results to an unclear image.

When the viscosity is more than 30 m Pa/sec, the viscosity of the recording liquid is so high that the recording liquid cannot be properly ejected from the nozzle. Such improper ejection (insufficient ejection) causes creation of white lines, thereby severely ruining the quality of the image. Even in a case where the recording liquid could be ejected, the droplet of the recording liquid is formed smaller than a desired size. This causes creation of lines formed thinner than expected, creation of lightly covered areas where expected to be more solidly covered, or portions with irregular density, thereby resulting to an unclear image.

Next, each part of the recording apparatus 100 is described.

It is preferable for the conveyor belt 25 to have a volume resistance ranging from 105-1015 Ω according to an embodiment of the present invention. A sufficient charge cannot be obtained when the resistance volume is less than 105 Ω. Such insufficient charge results to insufficient absorbing strength for the recording medium, and to jamming of the recording medium during conveyance. When the resistance is more than 1015 Ω, a slight amount of charge constantly remains on the conveyor belt 25 even after removal of charge. This causes dust and foreign particles to adhere to the conveyor belt 25 when the recording apparatus 100 is not in use. A large amount of dust or foreign particles adhering on the conveyor belt 25 results to decrease in absorbing strength and jamming of the recording medium.

It is preferable for the conveyor belt 25 to have a thickness ranging from 0.1-5.0 mm according to an embodiment of the present invention. When the thickness is less than 0.1 mm, mechanical strength of the conveyor belt 25 is insufficient that the conveyor belt 25 may gradually stretch and deform. Such deformation results to conveyance defects such as jamming during conveyance of the recording medium. When the thickness is more than 5.0 mm, in a case where the conveyor belt 25 is rotated in a state wrapped around two rollers (endless state), the size of the roller parts for the outer and inner side of the conveyor belt 25 would largely differ, thereby causing a strain that cannot be tolerated by the elasticity of the conveyor belt 25. When the conveyor belt 25 is continued to be used in such state, cracks are gradually formed at the surface of the conveyor belt 25 since mechanical stress is constantly applied to the conveyor belt 25. These cracks cause irregularities at the surface of the conveyor belt 25, and result to reduction of electrostatic absorbing force, or in some cases, the conveyor belt 25 may be severed.

It is preferable to form the conveyor belt 25 of the present invention as an endless type belt. By wrapping the belt to two rollers in an endless state, the recording medium can be conveyed at high speed.

As described above, the conveyor belt 25 may be formed as a multi-layer belt of two or more layers. It is preferable for the multi-layers to include at least one of a charge adjustment layer, a surface tension adjustment layer, mechanical strength reinforcement layer, or a chemical protection layer.

The charge adjustment layer serves to adjust the charge on the conveyor belt 25 to a volume resistance ranging from 105-10¹⁵ Ω for enabling steady conveyance of the recording medium. The material used for the layer may be, for example, resin, rubber, or metal.

In this embodiment according to the present invention, the resin of the charge adjustment layer is a plastic that can be formed into a desired shape by plastic deformation (for example, by applying heat or pressure). Although there are synthetic resins and natural resins used for the plastic, synthetic resin has more endurance than that of the natural resin, and provides a steady quality. Natural resin (e.g. rosin, copal, dammar, rhus) has little endurance and has little workability, therefore the quality thereof is unsteady.

The resin of the charge adjustment layer may be categorized into thermal plastic resin and thermosetting resin. The thermal plastic resin may further be categorized into hydrocarbon resin, polar vinyl resin, linear structure resin, and cellulose resin.

As for the hydrocarbon resin of the charge adjustment layer, there is, for example, polyethylene, polypropylene, polymethylpentene, polybutene, and crystalline polybutadiene. As for the polar vinyl resin, there is, for example, polyvinylchloride, polyvinylacetate, polyvinilidenechloride, ethylenevinylacetate copolymer (EVA, AS, ABS, ionomer, AAS, ACS), polymethacrylate (acryl), polytetrafluoroethylene, and ethylenepolytetrafluoroethylene copolymer.

As for the linear structure resin of the charge adjustment layer, there is, for example, polyacetal (polyoxymethylene), polyamide, polycarbonate, polyphenyleneether, polyethyleneteraphthalate, polyarylate (U polymer), polystyrene, polyethersulphone, polyimide, polyamideimide, polyphenylenesulfide, polyoxybenzoyl, polyetheretherketone, polyetherimide, nylon (registered trademark), and other liquid crystal polyester.

As for the cellulose resin of the charge adjustment layer, there is, for example, cellulose acetate, cellulose acetate butylate, cellophane, and celluloid.

The thermosetting resin of the charge adjustment layer may further be categorized into formaldehyde resin and bridging resin. As for the formaldehyde resin of the charge adjustment layer, there is, for example, phenol resin, urea resin, melamine resin, benzoguanamine resin, and other amino resins. As for the bridging resin of the charge adjustment layer, there is, for example, unsaturated polyester resin, diarylphthalate resin, alkyd resin, epoxy resin, urethane resin, silicone resin, and teflon (registered trademark) resin.

As for the rubber material of the charge adjustment layer, there is, for example, nitrile rubber, chloroprene rubber, ethylenepropylene rubber, nitrilebutadiene rubber, butyl rubber, natural rubber, styrenebutadiene rubber, and isoprene rubber.

As for the metal material of the charge adjustment layer, there is, for example, iron, copper, lead, stainless metal, nickel, and aluminum.

The surface tension adjustment layer serves to adjust the critical surface tension γc of the conveyor belt 25. The material of the surface tension adjustment layer may be, for example, resin or rubber.

The resin of the surface tension adjustment layer may be categorized into thermal plastic resin and thermosetting resin. The thermal plastic resin may further be categorized into hydrocarbon resin, polar vinyl resin, linear structure resin, and cellulose resin.

As for the hydrocarbon resin of the surface tension adjustment layer, there is, for example, polyethylene, polypropylene, polymethylpentene, polybutene, and crystalline polybutadiene. As for the polar vinyl resin, there is, for example, polyvinylchloride, polyvinylacetate, polyvinilidenechloride, ethylenevinylacetate copolymer (EVA, AS, ABS, ionomer, AAS, ACS), polymethacrylate (acryl), polytetrafluoroethylene, and ethylenepolytetrafluoroethylene copolymer.

As for the linear structure resin of the surface tension adjustment layer, there is, for example, polyacetal (polyoxymethylene), polyamide, polycarbonate, polyphenyleneether, polyethyleneteraphthalate, polyarylate (U polymer), polystyrene, polyethersulphone, polyimide, polyamideimide, polyphenylenesulfide, polyoxybenzoyl, polyetheretherketone, polyetherimide, nylon (registered trademark), and other liquid crystal polyester.

As for the cellulose resin of the surface tension adjustment layer, there is, for example, cellulose acetate, cellulose acetate butylate, cellophane, and celluloid.

The thermosetting resin of the surface tension adjustment layer may further be categorized into formaldehyde resin and bridging resin. As for the formaldehyde resin of the surface tension adjustment layer, there is, for example, phenol resin, urea resin, melamine resin, benzoguanamine resin, and other amino resins. As for the bridging resin of the surface tension adjustment layer, there is, for example, unsaturated polyester resin, diarylphthalate resin, alkyd resin, epoxy resin, urethane resin, silicone resin, and teflon (registered trademark) resin.

As for the rubber material of the surface tension adjustment layer, there is, for example, nitrile rubber, chloroprene rubber, ethylenepropylene rubber, nitrilebutadiene rubber, butyl rubber, natural rubber, styrenebutadiene rubber, and isoprene rubber.

The mechanical strength reinforcement layer serves to reinforce the mechanical strength of the conveyor belt 25 for enabling steady conveyance of the recording medium. In addition to the above-described resin materials and rubber materials, the mechanical strength reinforcement layer may also be formed, for example, fiber material.

The fiber material of the mechanical strength reinforcement layer may be categorized into carbon fiber, synthetic fiber, and natural fiber. As for the synthetic fiber of the mechanical strength reinforcement layer, there is, for example, acetate fiber, promix fiber, nylon (registered trademark) 6, nylon (registered trademark) 66, other nylon (registered trademark) fibers, aramid fiber, vinylon fiber, polyvinilidene choloride fiber, polyvinylchloride fiber, polyester synthetic fiber, polyacrylonitrile synthetic fiber, polyethylene synthetic fiber, polypropylene synthetic fiber, polyurethane synthetic fiber, polychlel fiber, rayon, other visose fibers, cuprammonium fiber, and other copper ammonia fibers. Since these materials are able to maintain a constant strength for a long period, use of the material enable steady conveyance of the recording medium. In addition, these materials have an advantage of providing a more uniform quality compared to that of natural fiber.

As for the natural fiber of the mechanical strength reinforcement layer, there is, for example, cotton, wool, pig bristles, boar fiber, angora, cashmere, mohair, alpaca, silk, linen., wood, and jute.

As for the carbon fiber of the mechanical strength reinforcement layer, there is, for example, PAN (polyacrylonitrile) carbon fiber, pitch carbon fiber, rayon carbon fiber, and vapor grown carbon fiber. Since these materials are able to maintain a constant strength for a long period, use of the material enable steady conveyance of the recording medium. In addition, since these materials are highly resistant to chemicals, it is suited to be used for special types of recording liquids.

The chemical protection layer serves to prevent recording liquid from adhering on the conveyance belt 3 for a long period, and to protect the conveyance belt 3 from being corroded by using a special type of recording liquid.

As for the material used for the chemical protection layer, there is, for example, polyethylene, polypropylene, polymethylpentene, polybutene, crystalline polybutadiene, polyvinylchloride, polyvinylacetate, polyvinilidenechloride, ethylenevinylacetate copolymer (EVA, AS, ABS, ionomer, AAS, ACS), polymethacrylate (acryl), polytetrafluoroethylene, ethylenepolytetrafluoroethylene copolymer, polyacetal (polyoxymethylene), polyamide, polycarbonate, polyphenyleneether, polyethyleneteraphthalate, polyarylate (U polymer), polystyrene, polyethersulphone, polyimide, polyamideimide, polyphenylenesulfide, polyoxybenzoyl, polyetheretherketone, polyetherimide, nylon (registered trademark), other liquid crystal polyester, cellulose acetate, cellulose acetate butylate, cellophane, celluloid, phenol resin, urea resin, melamine resin, benzoguanamine resin, other amino resins, unsaturated polyester resin, diarylphthalate resin, alkyd resin, epoxy resin, urethane resin, silicone resin, and teflon (registered trademark) resin.

In absorbing the recording medium to the conveyance belt according to an embodiment of the present invention, it is preferable to absorb the recording medium by using electrostatic force. Although there are other methods to absorbing the recording medium (e.g. using air suction, using an adhesive, disposing a needle-like bonding member on the conveyance belt), the electrostatic absorbing method, in comparison with the aforementioned methods, is the most simple and most reliable method in conveying the recording member 3 on the conveyor belt 25.

In electrostatically absorbing the recording medium according to an embodiment of the present invention, the conveyor belt 25 is charged prior to supplying the recording medium 3 to the conveyor belt 25. The charging unit for the conveyor belt 25 is not to be limited in particular as long as a charging effect can be attained. For example, a charge roller, a charge wire, a charge brush, or a charge blade may be used as the charging unit.

The charging of the conveyor belt 25 may be performed according to a principle (technique) of, for example, corona discharging, contact charging, frictional charging, separation charging, inductive charging, flow charging, and ejection charging.

In charging the conveyor belt 25 with a typical corona charging technique, voltage is applied to a wire disposed in parallel with the conveyor belt 25, and an electric field is impressed between the wire and the conveyor belt 25, to thereby discharge a high voltage to the conveyor belt 25. As an alternative of the wire, the corona charging method may be performed by disposing a roller, a brush, or a blade in a non-contacting manner with respect to the conveyor belt 25.

In charging the conveyor belt 25 with a typical contact charging technique, a voltage is applied in a state where a charge roller is contacting the conveyor belt 25, and an electric field is impressed between the charge roller and the conveyor belt 25, thereby creating a discharge at a slight gap between the charge roller and the conveyor belt 25. The contact charging method is advantageous compared to the corona discharge in that less ozone is generated with the contact charging method.

In charging the conveyor belt 25 (conveyor belt surface) with the frictional charging technique, a insulation member (e.g. roller, brush, blade) is rubbed against the conveyor belt 25 for creating movement and polarization of charges between the insulation member and the conveyor belt 25.

As an alternative of absorbing the recording medium on the conveyor belt 25, the recording medium may be closely appressed against the conveyance belt 25 by applying a force from a side opposite to the conveyor belt 25. More specifically, a spur roller, for example, may be employed for appressing against the recording medium.

Next, the cleaning roller 28 (recording liquid removing member) according to an embodiment of the present invention is described. The cleaning roller 28 (recording liquid removing member) of the present invention is not to be limited in particular as long as recording liquid can be absorbed (removed) by the cleaning roller 28. It is preferable for the cleaning roller 28 to employ a porous member or a water-absorbing polymer.

In a case of employing the porous member, the recording liquid is absorbed by capillary force. The porous member may further be categorized into fiber material (non-woven) or a foam material. The fiber includes, for example, a synthetic fiber such as acetate fiber, promix fiber, nylon (registered trademark) 6, nylon (registered trademark) 66, other nylon (registered trademark) fibers, aramid fiber, vinylon fiber, polyvinilidene choloride fiber, polyvinylchloride fiber, polyester synthetic fiber, polyacrylonitrile synthetic fiber, polyethylene synthetic fiber, polypropylene synthetic fiber, polyurethane synthetic fiber, polychlel fiber, rayon, other visose fibers, cuprammonium fiber, and other copper ammonia fibers, and a natural fiber such as cotton, wool, pig bristles, boar fiber, angora, cashmere, mohair, alpaca, silk, linen, wood, and jute. Meanwhile, the foam material refers to a high polymer that is foamed. The foam material includes, for example, polystyrene, polyurethane, and cellulose.

In a case of employing the water-absorbing polymer, the recording liquid is absorbed by concentration gradient of ions. As the water-absorbing polymer, there is, for example, polyacrylic acid, sodium polyacrylate, polyethyleneglycol, N-vinylacetoamide, and cellulose. It is preferable for the polymer to be a three dimensional structure from the aspect of enhancing liquid absorbing property.

As described above, recording liquid can be automatically removed from the conveyor belt 25 by attaching the recording liquid removing member 28 to the recording apparatus 100 according to an embodiment of the present invention. Accordingly, the user needs not to remove the recording liquid with his/her hand for cleaning the conveyor belt 25. When the surface tension of the recording liquid $\gamma$ and the critical surface tension of the conveyor belt $\gamma c$ satisfy the relation of $\gamma > \gamma c$, the recording liquid adhering to the conveyor belt 25 can be swiftly removed by the recording liquid removing member 28.

It is to be noted that the recording liquid may be removed by holding the recording liquid removing member by hand, and removing (wiping off) recording liquid. Furthermore, in removing the recording liquid, a cleaning liquid may be employed when wiping the recording liquid.

Figure 5:
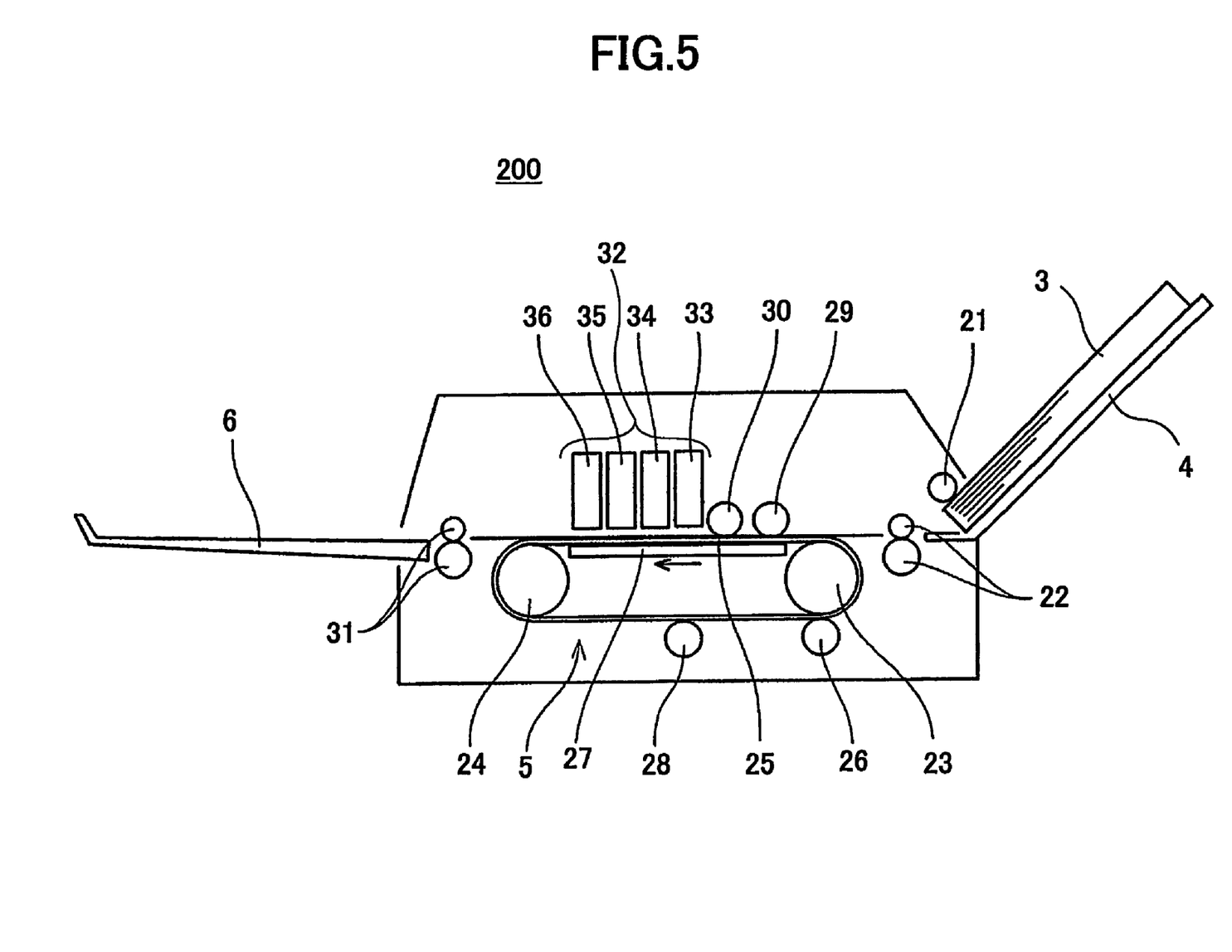
FIG. 5 is a schematic diagram showing a mechanism part of an inkjet recording apparatus (image forming apparatus) according to another embodiment of the present invention.

Next, an image forming apparatus 200 (recording apparatus) according to another embodiment of the present invention is described with reference to FIG. 5.

A plurality of line type heads 33-36, which include a recording liquid cartridge and a inkjet head formed into a united body, are disposed at an image forming part 32 of the image forming apparatus 200, in which the line type heads are provided with a nozzle alignment that is equivalent to the length of the recording medium 3 in the width direction (direction perpendicularly intersecting with the conveyance direction). The line type heads 33-36 are attached to a head holder (not shown).

The line type heads 33-36 eject droplets of recording liquid, for example, in an order of Black, Cyan, Magenta, and Yellow. The line type heads 33-36 may be provided as single heads with a plurality of nozzle alignments disposed at predetermined intervals for ejecting droplets of recording liquid of each color, or may alternatively be provided with separate heads (inkjet heads) and recording liquid cartridges. The other parts of the image forming apparatus 200 are the same as those of the aforementioned embodiment. By employing the line type head, a faster recording performance can be attained.

Next, a more detailed embodiment is described below; however, the present invention is not to be limited to this embodiment.

[Recording Liquid]

(1) Method of Manufacturing Recording Liquid 1

After mixing the below given components, the mixture is filtered using a 0.8 µm membrane filter, to thereby obtain recording liquid 1.

| | |
|---|---|
| carbon black (Cabojet 300 manufactured by Cabot Corporation) | 10 parts |
| humectant 1 (1,3-butandiol) | 20 parts |
| humectant 2 (glycerin) | 10 parts |
| humectant 3 (2-pyrolidone) | 2 parts |
| surface active agent (Orfin STG manufactured by Nissin Chemical Industry Co. Ltd.) | 4 parts |
| anti-rust agent (sodium thiosulfate) | 0.2 parts |
| anti-microbial agent (Proxel LV(s) manufactured by Avecia Ltd.) | 0.4 parts |
| ion exchange water | remainder |

The obtained recording liquid 1 was used after being further prepared to a pH of 10.5 by an LiOH aqueous solution.

The obtained recording liquid 1 at 25° C. has a static surface tension of 19.5 mN/m. Further, the obtained recording liquid 1 at 25° C. has a viscosity of 8.3 mPa·sec.

(2) Method of Manufacturing Recording Liquid 2

After mixing the below given components, the mixture is filtered using a 0.8 µm membrane filter, to thereby obtain recording liquid 2.

| | |
|---|---|
| carbon black (Cabojet 300 manufactured by Cabot Corporation) | 10 parts |
| humectant 1 (1,3-butandiol) | 20 parts |
| humectant 2 (glycerin) | 10 parts |
| humectant 3 (2-pyrolidone) | 2 parts |
| surface active agent (Orfin E1010 manufactured by Nissin Chemical Industry Co. Ltd.) | 1 part |
| anti-rust agent (sodium thiosulfate) | 0.2 parts |
| anti-microbial agent (Proxel LV(s) manufactured by Avecia Ltd.) | 0.4 parts |
| ion exchange water | remainder |

The obtained recording liquid 2 was used after being further prepared to a pH of 10.5 by an LiOH aqueous solution.

The obtained recording liquid 2 at 25° C. has a static surface tension of 22.1 mN/m. Further, the obtained recording liquid 2 at 25° C. has a viscosity of 8.1 mPa·sec.

(3) Method of Manufacturing Recording Liquid 3

After mixing the below given components, the mixture is filtered using a 0.8 µm membrane filter, to thereby obtain recording liquid 3.

| | |
|---|---|
| carbon black (Cabojet 300 manufactured by Cabot Corporation) | 10 parts |
| humectant 1 (1,3-butandiol) | 20 parts |
| humectant 2 (glycerin) | 10 parts |
| humectant 3 (2-pyrolidone) | 2 parts |
| surface active agent (Zonyl FS300 manufactured by Dupont Corp.) | 1 part |
| anti-rust agent (sodium thiosulfate) | 0.2 parts |
| anti-microbial agent (Proxel LV(s) manufactured by Avecia Ltd.) | 0.4 parts |
| ion exchange water | remainder |

The obtained recording liquid 3 was used after being further prepared to a pH of 10.5 by an LiOH aqueous solution.

The obtained recording liquid 3 at 25° C. has a static surface tension of 26.1 mN/m. Further, the obtained recording liquid 3 at 25° C. has a viscosity of 8.2 mPa·sec.

(4) Method of Manufacturing Recording Liquid 4

After mixing the below given components, the mixture is filtered using a 0.8 µm membrane filter, to thereby obtain recording liquid 4.

| | |
|---|---|
| carbon black (Cabojet 300 manufactured by Cabot Corporation) | 10 parts |
| humectant 1 (1,3-butandiol) | 20 parts |
| humectant 2 (glycerin) | 10 parts |
| humectant 3 (2-pyrolidone) | 2 parts |
| surface active agent (Dispanol TOC manufactured by Nippon Oil and Fats Co. Ltd.) | 1 part |
| anti-rust agent (sodium thiosulfate) | 0.2 parts |
| anti-microbial agent (Proxel LV(s) manufactured by Avecia Ltd.) | 0.4 parts |
| ion exchange water | remainder |

The obtained recording liquid 4 was used after being further prepared to a pH of 10.5 by an LiOH aqueous solution.

The obtained recording liquid 4 at 25° C. has a static surface tension of 32.0 mN/m. Further, the obtained recording liquid 1 at 25° C. has a viscosity of 8.4 mPa·sec.

(5) Method of Manufacturing Recording Liquid 5

(1) After mixing the below given components, the mixture is filtered using a 0.8 µm membrane filter, to thereby obtain recording liquid 5.

| | |
|---|---|
| carbon black (Cabojet 300 manufactured by Cabot Corporation) | 10 parts |
| humectant 1 (1,3-butandiol) | 20 parts |
| humectant 2 (glycerin) | 10 parts |
| humectant 3 (2-pyrolidone) | 2 parts |
| anti-rust agent (sodium thiosulfate) | 0.2 parts |
| anti-microbial agent (proxel LV(s) manufactured by Avecia Ltd.) | 0.4 parts |
| ion exchange water | remainder |

The obtained recording liquid 5 was used after being further prepared to a pH of 10.5 by an LiOH aqueous solution.

The obtained recording liquid 5 at 25° C. has a static surface tension of 40.5 mN/m. Further, the obtained recording liquid 5 at 25° C. has a viscosity of 8.5 mPa·sec.

[Conveyor Belt]

The below-given Table 1 shows various conveyor belts provided with one layer or a plurality of layers. Here, the critical surface tension γc of each of the conveyor belts are measured. The critical surface tension γc is measured according to the below-given procedure.

The measurement is performed by applying a droplet of a known liquid to each conveyor belt, and obtaining the contact angle θ of each conveyor belt. The surface tension of the known liquid γ is plotted with respect to cos θ, to thereby obtain a value in which γ satisfies cos θ=1. The obtained value is critical surface tension γc. The result of the measurement is shown in Table 1.

TABLE 1

|  | First Layer (Front-most layer) | Second Layer | Critical Surface Tension γc |
|---|---|---|---|
| Conveyor belt 1 | polytetrafluoroethylene (PTFE) |  | 18 |
| Conveyor belt 2 | silicon resin |  | 20 |
| Conveyor belt 3 | polyvinylidene chloride (PVDF) |  | 25 |
| Conveyor belt 4 | ethylene tetrafluoroethylene (ETFE) |  | 25 |
| Conveyor belt 5 | polyethylene (PE) |  | 31 |
| Conveyor belt 6 | polystyrene (PSt) |  | 33 |
| Conveyor belt 7 | polyvinyl chloride (PVC) |  | 39 |
| Conveyor belt 8 | polyethyleneterephthalate (PET) |  | 43 |
| Conveyor belt 9 | nylon |  | 46 |
| Conveyor belt 10 | ethylene tetrafluoroethylene (ETFE) | carbon fiber | 25 |
| Conveyor belt 11 | silicon resin | nitrile rubber (NBR) | 20 |

[Recording Liquid Removability Evaluation]

In evaluating recording liquid removability performance, a droplet of 1 ml is applied onto a conveyor belt, then an absorbent cotton is placed on the recording liquid, and then a weight weighing 20 grams is placed on the absorbent cotton for applying pressure to the absorbent cotton. After 1 minute elapses from the applying of pressure, the weight and the absorbent cotton are removed to visually examine whether any recording liquid is remaining on the conveyor belt.

Further, a plain paper (recording medium, Recording Paper Type 6200 (Product Name) manufactured by Ricoh Ltd.) is placed on the conveyor belt, and then a weight weighing 20 grams is placed on, the plain paper for applying force to the plain paper. After 1 minute elapses from the applying of pressure, the weight and the plain paper are removed to visually examine whether any recording liquid has transferred to the plain paper. In addition, the optical density for a portion on the conveyor belt corresponding to the portion to which the droplet has been applied for determining the quantity of recording liquid transferred to the plain paper. In order to dismiss the influence of the color of the plain paper, the optical density of the plain paper is measured before being placed on the conveyor belt. The value is then subtracted from the value of the optical density measured after placing the plain paper on the conveyor belt. The result of the measurement is shown in Table 2.

TABLE 2

|  |  | recording liquid 1 | recording liquid 2 | recording liquid 3 | recording liquid 4 | recording liquid 5 |
|---|---|---|---|---|---|---|
|  |  |  |  | γ |  |  |
|  | γc | 19.5 | 22.1 | 26.1 | 32.0 | 40.5 |
| conveyor belt 1 | 18 | ○ 0.03 | ◎ 0.00 | ◎ 0.00 | ◎ 0.00 | ◎ 0.00 |
| conveyor belt 2 | 20 | X 0.53 | ◎ 0.00 | ◎ 0.00 | ◎ 0.00 | ◎ 0.00 |
| conveyor belt 3 | 25 | X 0.72 | X 0.04 | ○ 0.04 | ◎ 0.00 | ◎ 0.00 |
| conveyor belt 4 | 25 | X 0.73 | X 0.03 | ○ 0.03 | ◎ 0.00 | ◎ 0.00 |
| conveyor belt 5 | 31 | X 0.74 | X 0.63 | X 0.63 | ○ 0.03 | ◎ 0.00 |
| conveyor belt 6 | 33 | X 0.78 | X 0.69 | X 0.69 | X 0.61 | ◎ 0.00 |
| conveyor belt 7 | 39 | X 0.81 | X 0.76 | X 0.76 | X 0.71 | ○ 0.03 |
| conveyor belt 8 | 43 | X 0.85 | X 0.81 | X 0.81 | X 0.76 | X 0.72 |
| conveyor belt 9 | 46 | X 0.89 | X 0.83 | X 0.83 | X 0.79 | X 0.73 |
| conveyor belt 10 | 25 | X 0.72 | X 0.04 | ○ 0.04 | ◎ 0.00 | ◎ 0.00 |
| conveyor belt 11 | 20 | X 0.53 | ◎ 0.00 | ◎ 0.00 | ◎ 0.00 | ◎ 0.00 |

In Table 2, "◎" and "○" is the result of the example of the present invention, and "X" is the result of the comparative example. "◎" represents that, no recording liquid is remaining on the conveyor belt, and no recording liquid has transferred to the plain paper. "○" represents that, although recording liquid is slightly remaining on the conveyor belt, hardly any recording liquid has transferred to the plain paper; thereby serving as no obstacle during actual operation. "X" represents that, recording liquid is remaining on the conveyor belt, and that recording liquid has transferred to the plain paper; thereby serving as an obstacle during actual operation.

Figure 6:
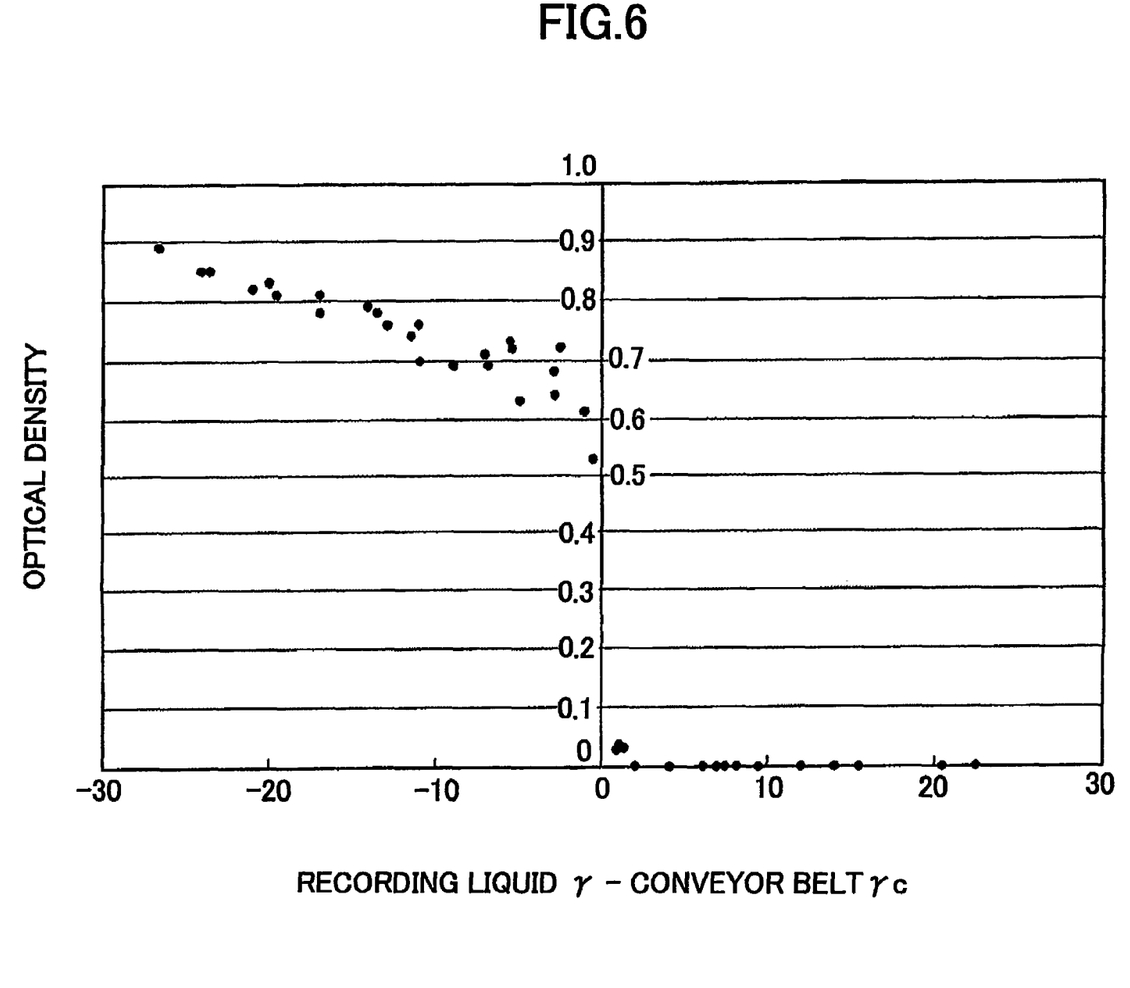
FIG. 6 is a graph for explaining an embodiment of the present invention.

FIG. 6 shows a graph in which the horizontal axis indicates the difference between the surface tension of the recording liquid γ and the critical surface tension of the conveyor belt γc, and the vertical axis indicates optical density. FIG. 6 shows that there is hardly any transfer (of the recording medium to the plain paper) at the area where γ−γc is positive, and that there is an increasing amount of transfer (of the recording medium to the plain paper) at the area where γ−γc is negative.

[Printing Evaluation]

Table 3 shows the results of a printing performance experiment, in which the experiment is performed by filling the recording liquid cartridge 15 with the recording liquids shown in Table 6, mounting the recording liquid cartridge 15 to the image forming apparatus 100 (see FIG. 1), and attaching the conveyor belt 25 to the image forming apparatus 100.

It is to be noted that polytetrafluoroethylene (PTFE, critical surface tension γc=18.0) is employed to the nozzle plate of the inkjet head (recording liquid cartridge 15) mounted to the image forming apparatus 100.

Recording paper Type 6200 (manufactured by Ricoh Ltd.: Product Name) is employed as the recording medium 3. Further, a thermal type inkjet head of 600 dpi is employed as the recording head.

TABLE 3

| Recording Liquid No. | Surface Tension γ | Conveyor Belt No. | Critical Surface Tension γc | Ejection Performance | Image Quality |
|---|---|---|---|---|---|
| 1 | 19.5 | 1 | 18 | Particle abnormality at portion of nozzles | white spots identified |
| 2 | 22.1 | 1 | 18 | satisfactory | satisfactory |
| 3 | 26.1 | 1 | 18 | satisfactory | satisfactory |
| 4 | 32 | 1 | 18 | satisfactory | satisfactory |
| 5 | 40.5 | 1 | 18 | satisfactory | satisfactory |

The image forming apparatus according to present invention may be applied as a facsimile apparatus, a duplication apparatus (copier), a complex apparatus combined of, for example, printer/facsimile/copier.

Further, the present invention is not limited to these embodiments, but various variations and modifications may be made without departing from the scope of the present invention.

The present application is based on Japanese Priority Application No. 2003-287281 filed on Aug. 6, 2003, with the Japanese Patent Office, the entire contents of which are hereby incorporated by reference.

The invention claimed is:

1. An image forming apparatus for forming an image on a recording medium by ejecting a recording liquid to the recording medium at a recording part, the image forming apparatus comprising:
a conveyor belt for conveying the recording medium to the recording part, the conveyor belt satisfying a relation of $\gamma > \gamma c$,
wherein $\gamma$ (mN/m) is a static surface tension of the recording liquid at 25° C., and $\gamma c$ (mN/m) is a critical surface tension of the conveyor belt,
wherein the recording liquid contains a color material in a dispersed state.

2. The image forming apparatus as claimed in claim 1, wherein the conveyor belt absorbs the recording medium thereto when conveying the recording medium.

3. The image forming apparatus as claimed in claim 2, wherein the conveyor belt absorbs the recording medium by using electrostatic force.

4. The image forming apparatus as claimed in claim 1, further comprising a cleaning part for removing the recording liquid situated on the conveyor belt.

5. The image forming apparatus as claimed in claim 4, wherein the cleaning part is a porous member.

6. A recording liquid for being ejected to a recording medium conveyed by a conveyor belt, the recording liquid comprising:
a color material in a dispersed state,
wherein the recording medium satisfies a relation of $\gamma > \gamma c$,
wherein $\gamma$ (mN/m) is a static surface tension of the recording liquid at 25° C., and $\gamma c$ (mN/m) is a critical surface tension of the conveyor belt.

7. The recording liquid as claimed in claim 6, wherein the static surface tension of the recording liquid $\gamma$ satisfies a relation of $\gamma \geqq 20$.

8. The recording liquid as claimed in claim 6, wherein the color material is a pigment.

9. The recording liquid as claimed in claim 6, further comprising a humectant.

10. The recording liquid as claimed in claim 6, wherein the recording liquid at 25° C. has a viscosity ranging from 1 mPa·sec to 30 mPa·sec.

11. A recording liquid cartridge comprising:
an ink containing unit for containing the recording liquid of claim 6.

12. A conveyor belt for conveying a recording medium to a recording part at which a recording liquid is ejected onto the recording medium, the conveyor belt comprising:
a belt part satisfying a relation of $\gamma > \gamma c$,
wherein $\gamma$ (mN/m) is a static surface tension of the recording liquid at 25° C., and $\gamma c$ (mN/m) is a critical surface tension of the belt part of the conveyor belt,
wherein the recording liquid contains a color material in a dispersed state.

13. The conveyor belt as claimed in claim 12, wherein the belt part is formed of two or more layers.

14. The conveyor belt as claimed in claim 13, wherein at least one of the two or more layers is a charge adjustment layer.

15. The conveyor belt as claimed in claim 13, wherein at least one of the two or more layers is a surface tension adjustment layer.

16. The conveyor belt as claimed in claim 13, wherein at least one of the two or more layers is a mechanical strength adjustment layer.

17. The conveyor belt as claimed in claim 13, wherein at least one of the two or more layers is a chemical protection layer.

* * * * *